No. 12,611.
REISSUED FEB. 19, 1907.
T. L. & T. J. STURTEVANT.
DOUBLE CARBURETER FOR EXPLOSIVE ENGINES.
APPLICATION FILED NOV. 9, 1906.
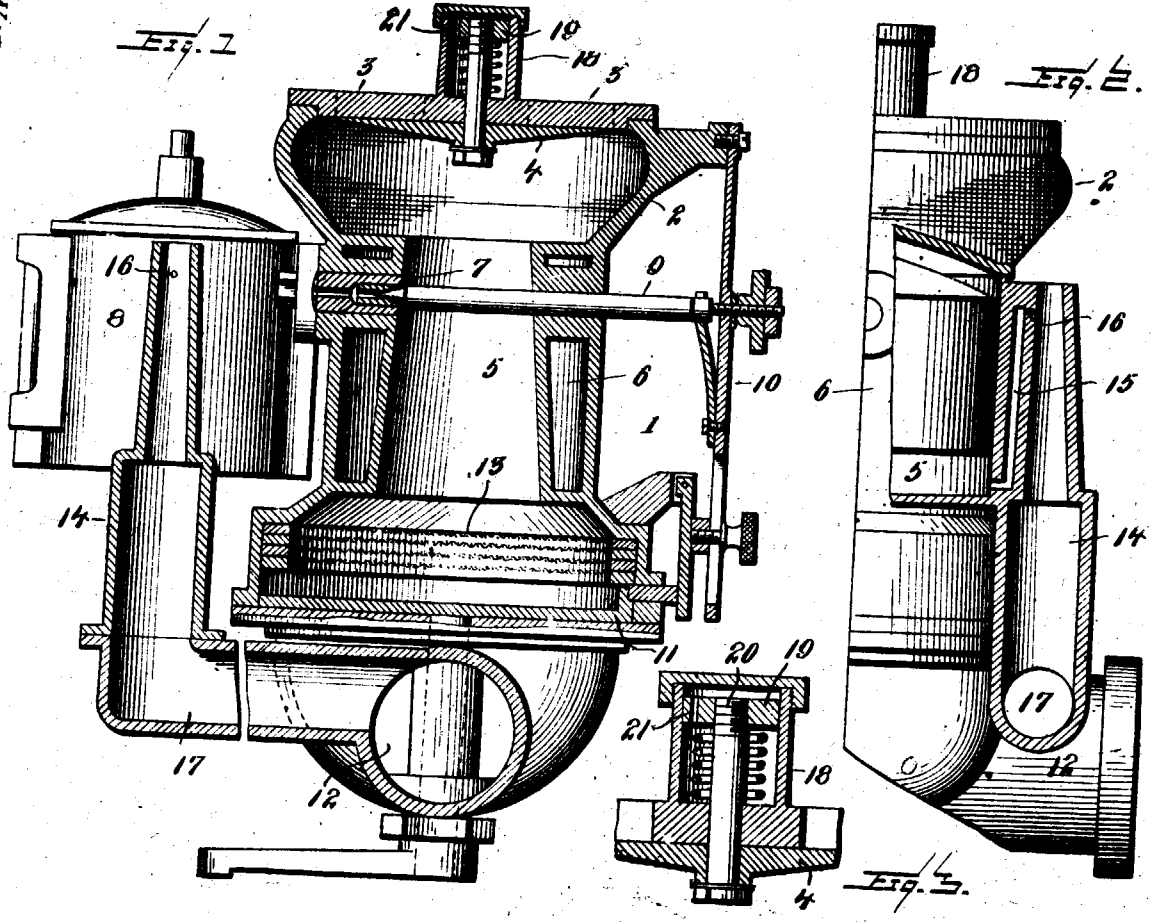
WITNESSES:
H. F. Hoyle.
C. M. Sweeney.
INVENTORS:
Thomas L. Sturtevant,
Thomas J. Sturtevant,
BY
Henry Calvert
Attorney

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, AND BOSTON, MASSACHUSETTS, A CORPORATION OF MAINE.

DOUBLE CARBURETER FOR EXPLOSIVE-ENGINES.

No. 12,611. Specification of Reissued Letters Patent. Reissued Feb. 19, 1907.

Original No. 755,074, dated March 22, 1904. Application for reissue filed November 9, 1906. Serial No. 342,753.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented certain new and useful Improvements in Double Carbureters for Explosive-Engines, of which the following is a specification, reference being had therein to the accompanying drawings.

In the operation of gas-engines which are fed with an explosive mixture of carbureted air some difficulty has been experienced in throttling the engine down to its minimum speed and power without stopping it, this trouble being due to the fact that too fine an adjustment of the throttling devices for controlling the delivery of the explosive mixture to the engine is necessary to be practical and the control of the engine, therefore, is not at all times absolute or satisfactory.

Another objection to the type of carbureter commonly used with explosive-engines is that in starting, if the air-passages of the carbureter be large, as they must necessarily be in order that the full power of the engine may be obtained at high speeds, the air-current which is drawn through these large air-passages of the carbureter is very sluggish when the engine is at its low starting speed, and such sluggish current fails to suck enough oil from the oil-reservoir to give the desired strength of explosive mixture, but delivers a weak and unsatisfactory fuel to the cylinders of the engine. On the other hand, if the air-passages of the carbureter be so small as to afford an air-current of sufficient rapidity to be effective at starting speed the resistance to the air movement when the engine attains high speeds will be so great as to result in loss of power and seriously impair the efficiency of the engine.

It is with the object of overcoming the objections noted that we have devised the present construction of fuel-supplying apparatus for explosive-engines, and a carbureter made in accordance with our invention will not only prevent the accidental stopping of the engine because of careless throttling down of the explosive mixture which is being supplied to the engine-cylinders, but it will also render the starting of the engine at low starting speeds certain and easy without sacrificing in the slightest degree the power of the engine at high speeds.

Briefly stated, the invention consists in forming the carbureter double—that is to say, having two carbureting-chambers of different fuel capacities which deliver to the engine-cylinders together under normal running conditions and supply the maximum amount of fuel, but one of which (the main carbureter) may be throttled down or cut out entirely when it is desirable to reduce speed, under which conditions the other or auxiliary carbureter, which is the smaller and which is always open, will supply a minimum amount of fuel sufficient to keep the engine at low speed and prevent its stopping. Furthermore, in starting the engine the smaller carbureter is of the proper capacity to supply the exact charge of fuel to give a proper starting charge at low starting speed and insure the initial starting of the engine, after which the throttled carbureter may be thrown into action and the engine brought up to its full speed.

Another feature of the present device is an automatic controlling-valve for the air-inlet to the main-carbureter chamber of such construction that the action of the valve will be steady and noiseless, so as to avoid the fluttering of the air-valve when the engine is running, such fluttering being objectionable for the reason that the valve is liable to be extremely noisy when operating rapidly and for the further reason that the full supply of air is not always delivered, the rebound of the valve cutting off and checking the air too suddenly when the engine is at high speeds.

In the drawings which accompany and form a part of this specification we have illustrated a carbureter embodying our invention, and in said drawings—

Figure 1 is a view, partly in section, showing the double carbureter which forms the main feature of the present invention, the automatic air-valve, to which reference has been made, being shown at the top of the main-carbureter casing. Fig. 2 is a detail view, partly in section, of a portion of the apparatus to show the oil-passage connecting the oil-reservoir and the auxiliary carbureter.

Fig. 3 is a detail sectional view, on an enlarged scale, of the dash-pot steadying and checking device for the air-valve.

Referring to the drawings by numbers, like numbers indicating like parts in the several views, 1 indicates the main or throttled carbureter, and it may be here stated that as the details of construction of the main carbureter form no part of the present invention and are not herein claimed the description of the construction will be general and only specific enough to give a clear understanding of the novel features of the present case, the main carbureter shown forming the subject-matter of a separate patent granted to us December 15, 1903, No. 747,264. The said main carbureter 1, which supplies the explosive mixture for the engine when the same is at high or full speed, has at its upper end the conical air-chamber 2, which is supplied with air through suitable ports 3, said ports being controlled by a spring-closed vacuum-controlled and check valve 4, said valve 4 being light and readily responsive to vacuum in the air-chamber during the suction or intake of the engine and closing also readily and quickly to check the inflow and close the carbureter during the power-stroke of the engine. The valve 4 is provided with a steadying device to reduce its fluttering, which will be fully described hereinafter. Said air-chamber 2 delivers to a coned or flaring mixing and accelerating chamber 5, which may be jacketed, as at 6, to provide for the circulation of a heating or cooling medium about the mixing-chamber 5, as desired. The said chamber 5 is provided in its side wall with an oil-inlet 7, leading from the reservoir 8, said inlet being controlled by a needle-valve 9, which passes through the opposite wall of the chamber 5 and which is connected with a valve controlling or regulating lever 10, which through suitable connections is operatively connected with a throttle-valve 11, mounted in the lower part of the carbureter beneath the mixing-chamber 5, so that as the throttle-valve is moved simultaneous movements will be imparted to the needle-valve 9, all as fully set forth in our patent hereinbefore referred to.

The throttle-valve 11 controls the exit of the air which has been carbureted in passing through the chamber 5 and its delivery to the engine fuel-supply passage 12 in the ordinary manner, screens 13 to break up and prevent passage of drops of oil to the engine-cylinders being interposed between the chamber 5 and the throttle-valve.

Located in convenient relation to the main carbureter 1 is the starting or auxiliary carbureter 14, which, as shown, is preferably formed integral with the wall of the fuel-reservoir (see Fig. 2) with which it is connected by means of an oil-passage 15, which delivers through an opening or duct 16 to the mixing-chamber of the auxiliary carbureter 14, near the reduced upper open end thereof, said mixing-chamber being conical in form and flaring downwardly with its small end at the mouth thereof to give the requisite acceleration to the air. Said auxiliary carbureter 14, as shown, is always open and communicates by means of a suitable passage 17 with the fuel-supply passage 12, hereinbefore referred to, which forms the common connection between the engine and the main and auxiliary carbureters.

In operation, assuming that the engine be at rest and the throttle-valve of the main carbureter closed, the engine will be manually turned to give the initial suction or intake stroke to the piston. The suction being through the auxiliary carbureter, fuel in sufficient quantity and of the proper richness will be supplied thereby to start the engine and keep it running at low speed, and the main carbureter can then be thrown into service by opening the throttle-valve and the engine brought to its full speed and power with both carbureters in service and a maximum supply of fuel being delivered to the engine-cylinders. When it is desired to slow down, this may be gradually or quickly done by throttling down the main carbureter until it is entirely cut out, and yet complete stoppage of the engine cannot occur owing to careless throttling down, for the reason that the auxiliary carbureter is still in service and independent of the control of the main carbureter and affords a constant minimum supply of fuel.

As has been hereinbefore stated, the vacuum-controlled air-inlet and check valve 4 as heretofore constructed has been objectionable because of its fluttering during the running of the engine, such fluttering when the engine is at high speed causing a noisy "chattering" of the valve, besides giving an irregular air-supply, due to the rapid rebounding of the valve. To obviate these objections, we provide the top plate of the carbureter 1 with a closed dash-pot 18, in which a piston 19 on the stem 20 of the valve plays, said piston 19 having the usual relief or leakage port 21 therethrough to permit easy regular movements of the valve 4 in either direction. By this construction the valve 4 is steadied in its action, the objectionable chattering at high engine speeds avoided, and all danger of cutting off the air-supply and causing non-uniform charges of explosive mixtures is eliminated.

While we have described and shown the auxiliary carbureter as being an open carbureter, which delivers fuel to the cylinder through an open passage, it will be apparent that a regulating throttle-valve may, if desired, be placed in the auxiliary-carbureter outlet and so control the delivery of fuel from the auxiliary carbureter, such a construction being desirable for the reason that by providing throttling or regulating means for the auxiliary carbureter its capacity may be varied to adapt it to engines of different sizes and the charge of fuel delivered from the auxiliary carbureter may be regulated to meet varying conditions. Our auxiliary carbureter will, however, preferably always be open to the engine cylinder or cylinders in the starting, as also in the normal running, of the engine, even if provided with a regulating or throttle valve, as it is not necessary that such valve should ever be entirely closed.

While we have shown and described a particular type of main carbureter, as well as a desirable and efficient construction of auxiliary carbureter, we do not wish to be understood as limiting our invention to the details herein shown and described, as these may be varied widely without departing from the spirit of our invention. It will also be apparent that while we have shown the main and auxiliary carbureters as supplied from a common reservoir and as delivering to the engine through a common passage separate reservoirs and independent passages might be used, if desired.

Having thus described our invention, we claim and desire to secure by Letters Patent—

1. Fuel-supplying apparatus for gas-engines, comprising the combination with a main carbureter having a fuel-outlet, and a throttle-valve controlling said fuel-outlet, whereby the amount of fuel supplied from said main carbureter may be varied or completely shut off; of an auxiliary carbureter coöperating with said main carbureter, said auxiliary carbureter having an open fuel-outlet, whereby a desired minimum fuel-supply for the engine is afforded.

2. Fuel-supplying apparatus for gas-engines, comprising the combination with a main carbureter having air and oil inlets, valves controlling said inlets, a fuel-outlet; and a throttle-valve controlling said fuel-outlet, whereby the amount of fuel supplied to the engine from said main carbureter may be varied or completely shut off, of an auxiliary carbureter coupled and coöperating with said main carbureter, said auxiliary carbureter having open air and oil inlets, and an open fuel-outlet, whereby a desired minimum fuel-supply for the engine is afforded.

3. Fuel-supplying apparatus for gas-engines comprising the combination with a main carbureter having an air-inlet of relatively large area and a valve controlling said inlet, of an auxiliary carbureter having an open air-inlet of relatively small area, whereby a desired constant minimum supply of fuel to the engine will be afforded.

4. In a fuel-supplying apparatus for gas-engines, the combination with a main carbureter provided with a mixing-chamber, an air-inlet valve controlling the supply of air to said chamber, a fuel-supply valve delivering to said chamber, and a throttle-valve controlling the outlet from said chamber and by which the fuel-supply to the engine from said main carbureter may be regulated or entirely shut off, of an auxiliary carbureter delivering to the fuel-passage to the engine and by which a desired minimum fuel-supply is afforded.

5. Fuel-supplying apparatus for explosion-engines comprising the combination with a main carbureter having a valve-controlled air-inlet, a valve-controlled oil-inlet, and a throttle-valve-controlled fuel-outlet; of an auxiliary carbureter having an open air-inlet, an open oil-inlet, and an open fuel-outlet, both carbureters delivering to the engine through a common passage-way.

6. Fuel-supplying apparatus for explosion-engines comprising the combination with a main carbureter having a vacuum-controlled valve for the air-inlet, a valve-controlled oil-inlet, and a throttle-valve-controlled fuel-outlet, of an auxiliary carbureter having an open air-inlet, an open oil-inlet, and an open fuel-outlet, both carbureters delivering to the engine through a common passage-way.

7. In fuel-supplying apparatus for explosive-engines, the combination with a main carbureter having an air-inlet, an oil-inlet, and a fuel-outlet, of an oil-reservoir, a throttle-valve controlling said fuel-outlet, whereby the supply of fuel to the engine from said main carbureter may be varied or completely shut off, a valve to control said oil-inlet connected with and operable from said throttle-valve, and an auxiliary open carbureter having an open oil-passage connecting with said reservoir, whereby a desired constant minimum supply of fuel to the engine is maintained while the engine is running.

8. An oil-reservoir for carbureters having a downwardly-flaring vertical carbureting-chamber formed integral with the side wall of said reservoir and open to the outer air at its upper end, and an oil-passage traversing the wall of said reservoir, said oil-passage communicating with the chamber of said reservoir and delivering to said carbureting-chamber near the upper reduced open end thereof and at a point above the normal oil-level in the reservoir.

In testimony whereof we affix our signatures in presence of two witnesses.

THOMAS LEGGETT STURTEVANT.
THOMAS JOSEPH STURTEVANT.

Witnesses:
W. T. ELLIS,
L. H. STURTEVANT.